United States Patent [19]

Dutt

[11] Patent Number: 4,844,272
[45] Date of Patent: Jul. 4, 1989

[54] CLOSURE SYSTEM WITH EXTENDABLE TAMPER BAND BONDED TO CONTAINER

[75] Inventor: Herbert V. Dutt, Sarasota, Fla.

[73] Assignee: Continental Plastics, Inc., Tridelphia, W. Va.

[21] Appl. No.: 276,655

[22] Filed: Nov. 28, 1988

[51] Int. Cl.[4] .............................................. B65D 41/34
[52] U.S. Cl. ..................................... 215/232; 215/252
[58] Field of Search ................ 215/232, 252; 220/266, 220/359

[56] References Cited

U.S. PATENT DOCUMENTS

| | | | |
|---|---|---|---|
| 3,259,233 | 9/1963 | Beeman | 220/214 |
| 3,604,596 | 1/1969 | Khoury et al. | 222/153 |
| 3,788,509 | 1/1974 | Keeler | 215/232 |
| 4,197,955 | 4/1980 | Luenser | 215/252 |
| 4,461,391 | 7/1984 | Davis | 215/252 |
| 4,570,825 | 2/1986 | Stull | 222/45 |
| 4,596,339 | 6/1986 | Andersson | 215/252 |
| 4,640,427 | 2/1987 | Marino et al. | 215/232 |
| 4,702,383 | 10/1987 | Wender | 215/232 |
| 4,768,666 | 9/1988 | Kessler | 215/232 |

*Primary Examiner*—Donald F. Norton
*Attorney, Agent, or Firm*—Richard V. Westerhoff

[57] ABSTRACT

A closure system includes a container and a closure comprising a cap having a cylindrical skirt with internal threads, an annular tamper band having an inside diameter larger than the outside diameter of the skirt forming an annular gap therebetween, and flexible bridges joining the tamper band to the free end of the cap skirt. The bridges have angularly spaced end segments extending radially outward and radially inwardly from the skirt and tamper band respectively, and an intermediate segment extending arcuately around the gap between the end segments. The closure is integrally molded with the bridges and tamper band extending radially outward in a common plane transverse to the central axis of the cap. The bridges flex to allow axial extension of the tamper band for bonding to a shoulder or transfer bead on the container. Unscrewing of the cap fractures the bridges, preferably at a section of reduced cross-section provided by notches at the intersection of the bridges with the cap skirt. The set of the resilient bridges causes them to spring against the container shoulder or transfer bead upon fracturing to provide a positive visual indication of opening or tampering with the closure.

20 Claims, 3 Drawing Sheets

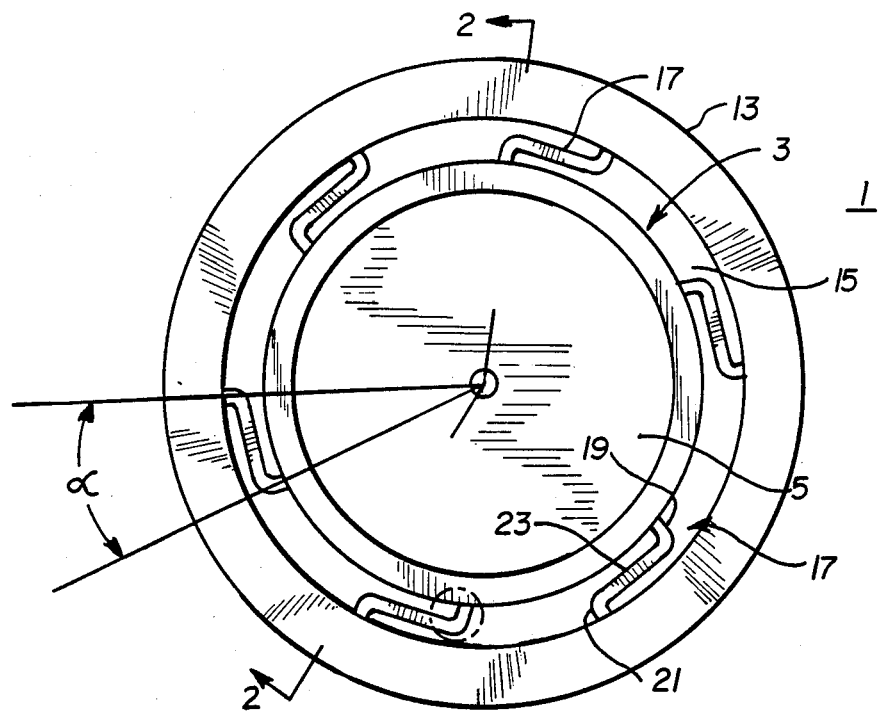
FIG. 1
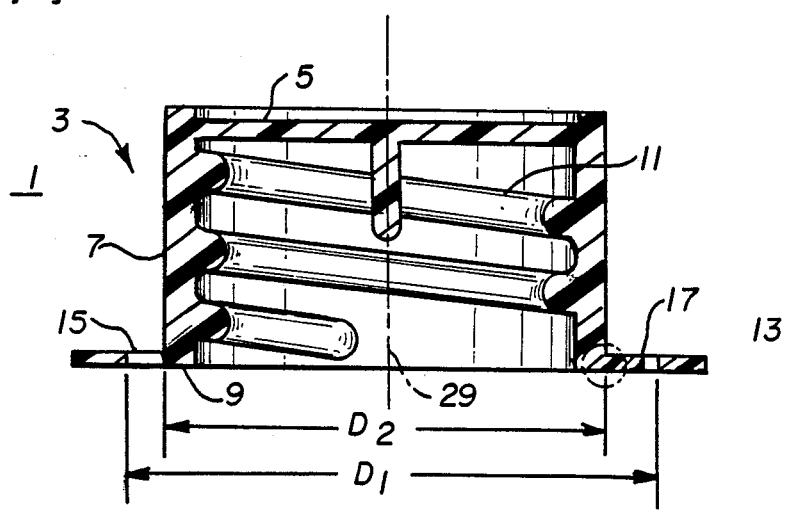
FIG. 2
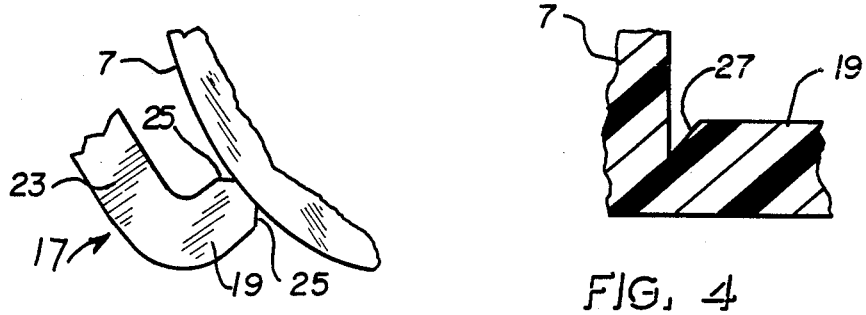
FIG. 3
FIG. 4

CLOSURE SYSTEM WITH EXTENDABLE TAMPER BAND BONDED TO CONTAINER

BACKGROUND OF THE INVENTION

This invention relates to container closures, and such closures in combination with the container, which provide a positive visual indication that the container has been opened. More particularly, it relates to closures in which an annular tamper band bonded to the container is connected to the skirt of a cap by resilient bridges designed to fracture when the cap is removed such as by unscrewing.

BACKGROUND INFORMATION

There has been a recent trend toward container closures which provide a visual indication of tampering. Many of these closures include a tamper band secured to the cap by bridges which fracture upon removal of the cap. In some of these closures, the tamper band snaps over a transfer bead on the container neck so that tension is applied to the bridges as the cap is unscrewed. In other closures, the tamper band is bonded such as by sonic welding, the application of heat, gluing or by a laser beam to the transfer bead or the side of the container.

A closure of the latter type is described in U.S. Pat. No. 4,768,666. In this closure, a radial flange secured to the cap by a tear away zone is welded to a radial flange on the container. The tear away zone comprises integrally formed ribs extending axially between the radially extending closure flange and the cylindrical side wall of the cap. Such a cap is difficult to mold, as it requires retractable mold pieces to define the axially extending ribs or bridges between the cap flange and the cap skirt. It also requires very close tolerances so that the cap flange seats against the container flange with the cap screwed down into sealing engagement with the opening of the container. Corresponding close tolerances are also required on the container to assure proper seating of the cap.

U.S. Pat. No. 4,197,955 discloses a closure in which an annular cap flange is integrally molded below a screw cap with connecting ribs extending downward from the cap sidewall to the cap flange. The connecting ribs have a direction of downward slope opposite to the direction of the helix angle of the cap thread such that with the annular cap flange bonded to a container flange, it is possible to loosen the cap from its tightened position prior to having to fracture the tamper-indicating connecting ribs. Hence, the user does not have to apply a force greater than that required to loosen the cap or fracture the connecting ribs. This closure is integrally molded with the annular tamper band disposed below the cap skirt a distance which brings the tamper band into contact with the container shoulder when the cap is screwed onto the container neck. Again close tolerances must be kept on both the container and the closure to assure proper sealing of the container, but also to assure proper functioning of the connecting ribs.

On both of these above closures, there is no positive realignment of the bridges or connecting ribs upon fracture. Hence, when these closures are replaced on the respective containers, the fractured bridges or connecting ribs assume their original orientation and provide the visual appearance, without close inspection, that the closure has not been opened or tampered with.

Generally where the tamper band is bonded to the container, the closure, with its integral tamper band, is made of the same material as the container. Dissimilar materials cannot be easily bonded to one another. Notably, sonic welding and heat welding have not been successfully utilized in bonding such dissimilar materials as polyethylene terephthalate (PET), polyvinyl chloride, polypropylene, high density polyethylene and low density polyethylene. More success has been achieved with gluing such dissimilar materials together. However, gluing is more complex than welding, and consequently not as desirable.

There is a need therefore for a closure system of the type including a tamper band bonded to the container which provides a positive indication that the closure has been opened or tampered with.

There is also a need for such a closure system which can accommodate loose tolerances in both the closure and the container dimensions.

There is a further need for such a closure system which includes a container with a slanting shoulder to which the tamper band is bonded.

There is an additional need for a closure system in which a tamper band can be welded to a container made of a dissimilar material.

SUMMARY OF THE INVENTION

These and other needs are satisfied by the invention which is directed to a closure system which includes a container having closure engaging means such as threads on a neck and a generally laterally extending surface such as a shoulder or transfer bead axially spaced from the engagement means. The closure system also includes a closure comprising a cap which includes a cylindrical skirt member, and an annular tamper band member having an inside diameter larger than the outside diameter of the skirt member. The tamper band member is connected to the free end of the skirt member by a plurality of connecting bridges spanning the gap between these members. The connecting bridges include a first segment extending radially outward into the gap from the free end of the skirt members, a second segment angularly spaced from the first segment and extending radially inward into the gap from the tamper band member, and an intermediate section extending accurately around the gap between the first and second segments. The cap, annular tamper band member, and the bridges are integrally molded with the tamper band member and bridges extending radially outward from the free end of the cylindrical skirt in a common plane transverse to the central axis of the cap. The bridges are flexible and bend to permit axial extension of the annular tamper band member relative to the cylindrical skirt member to bring the tamper band member into contact with the shoulder or transfer bead on the container for bonding thereto. The bridges fracture when the cap is removed from the container, and being resilient, spring toward the member to which they remain integrally attached to provide a positive visual indication that the bridges have been fractured.

Preferably, the bridges fracture at their intersection with the skirt member. Notches in the bridges at this point produce a section of reduced cross-section along which the bridge fractures. Thus, upon fracturing, the bridges spring against the container adjacent the tamper band member.

The tamper band is bonded to the container such as by sonic welding, heat welding, laser beam welding or gluing. Where the tamper band and container are made of dissimilar materials, a projection or recess in the harder material forms an undercut ledge under which the softer material can flow when softened by applied energy, to form a secure mechanical connection.

The closure of the invention can be easily and inexpensively injection molded, does not require tight tolerances in the closure or container dimensions, and provides a clear, visual indication if the closure has been removed or tampered with.

BRIEF DESCRIPTION OF THE DRAWINGS

A full understanding of the invention can be gained from the following description of the preferred embodiment when read in conjunction with the accompanying drawings in which:

FIG. 1 is a top plan view of a container closure in accordance with the invention.

FIG. 2 is a vertical sectional view through the container closure of FIG. 1 taken along the line 2—2.

FIG. 3 is an enlarged plan view illustrating the details of the encircled portion of the container closure of FIG. 1.

FIG. 4 is an enlarged vertical sectional view illustrating the details of the encircled portion of the container closure of FIG. 2.

DESCRIPTION OF THE PREFERRED EMBODIMENT

Figure 5:
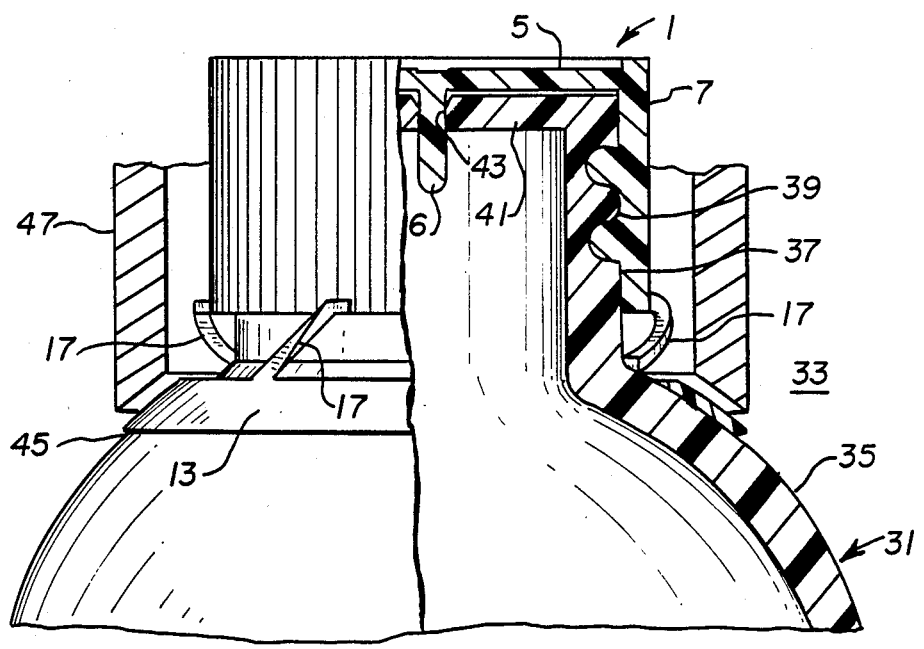
FIG. 5 is a side view with part in section of the closure of FIGS. 1-4 in place on a container with the connecting bridges intact.

Referring to the drawings, and specifically FIGS. 1 and 2, the invention is directed to a closure system which includes a closure 1 comprising a cap 3 having an end wall 5 and a cylindrical skirt member 7 depending from the end wall and terminating in a free end 9. A stopper 6 extends axially from the inner surface of the end wall 5 concentric with the cylindrical skirt member 7. The skirt member 7 is preferably provided with internal threads 11 for securing the cap 3 to a container. The cap 3 further includes a flat annular tamper band member 13 extending radially outward from the free end 9 of the skirt member 7. The inner diameter $D_1$ of the tamper band member 13 is greater than the outside diameter $D_2$ of the skirt member so that an annular gap 15 is formed between the tamper band member 13 and the skirt member 7.

The cap 3 also includes flexible bridges 17 which join the tamper band member 13 to the free end 9 of the skirt member 7. These bridges 17 each include a first segment 19 which extends radially outward from the skirt member 7 into the annular gap 15, and a second segment 21 which extends radially inward from the tamper band member 13 at a point angularly spaced by an angle α from the first segment 19. An intermediate bridge segment 23 extends along the annular gap 15 between the first and second segments 19 and 21. In the exemplary closure, there are six bridges 17 equally spaced 60 degrees apart around the gap 15 and the angle α is 25 degrees. Other numbers of bridges can be used and the angle α adjusted dependent upon the amount of axial extension needed for the tamper band 13 as will be more fully described below.

As can be seen from FIGS. 3 and 4, the first segment 19 of each bridge 17 is notched at each side at 25 and along its top surface at 27 to form a section of reduced cross-section at the intersection of the first segment 19 with the skirt member 7.

The closure 1 is molded in one piece with the integral bridges 17 and tamper band member 13 extending radially outward from the free end 9 of the skirt member 7 in a common plane perpendicular to the central axis 29 of the cap This configuration of the closure can be readily injection molded without the need for lateral inserts so that the finished closure can be pulled straight out of the mold. The closure 1 can be injection molded from any resilient thermoplastic resin such as, for example, polypropylene terephthalate (PET), polypropylene, polyvinyl chloride, high density polyethylene or loss density polyethylene.

As shown in FIGS. 4 and 5, the closure 1 is used in conjunction with a container 31 to form a closure system 33. The container 31 includes a main body 35 terminating in a neck 37 which is provided with external threads 39 complimentary to the internal threads 11 on the cap skirt member 7. An end wall 41 in the neck has a central dispensing opening 43. The main body 35 of the container 31 defines a generally laterally extending surface or shoulder 45 axially spaced from the threads 39.

The cap 3 is screwed into the neck 37 of the container with the stopper 6 on the cap plugging the dispensing opening 43 in the container end wall 41. An annular fixture 47 is then lowered over the cap 3 to press the tamper band member 13 down into contact with the surface 45 on the container 31. The bridges 17 flex to permit this axial extension of the tamper band member 13 with respect to the skirt member 7. The tamper band member 13 is then bonded to the surface 45 of the container body. Preferably, bonding is effected through sonic welding by the application of acoustic energy to the tamper band through the annular fixture 47. Bonding can also be accomplished through the application of heat to the tamper band and container surface 45, or by other means such as by glueing. A means for assuring a good mechanical connection between the tamper band member 13 and container body 35 when the closure 1 and container 31 are made of different materials is discussed below.

The flexible bridges 17 permit the tamper band member 13 to be axially extended over a wide range of distances. Thus, tolerances on the closure 1 and the container 31 do not have to be tight, yet the cap can be fully seated to seal the dispensing opening and the tamper band member 13 can be brought into full contact with the container shoulder for bonding.

Figure 6:
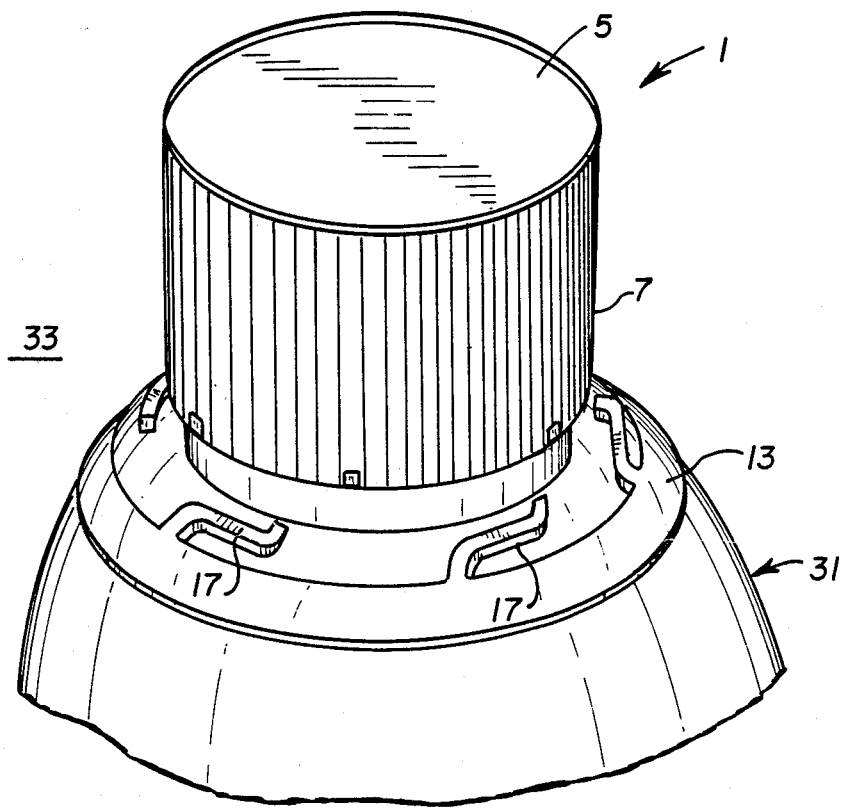
FIG. 6 is an isometric view similar to FIG. 5 illustrating the closure of FIGS. 1-5 which has been removed from the container and reapplied.

The integral bridges 17 provide a clear visual indication that the container has not been opened or tampered with. Unscrewing the cap to remove it from the container applies a tension force to the bridges 17 which results in fracturing of the bridges at the area of reduced cross section formed by the notches 27 and 27 along the intersection of the first segments 19 of the bridges 17 and the skirt member 7 on the cap. As shown in FIG. 6, the set of the resilient bridges which results from molding them in a common plane with the tamper band member 13, as shown in FIG. 1, causes the fractured bridges 17 to spring against the container shoulder 14 adjacent to the tamper band member 13 which remains affixed to the container. This positive separation of the bridges from the skirt 7 of the cap provides a clear indication that the container has been opened or tampered with. While the bridges could be designed to fracture at the tamper band member 13 so that they would remain with and spring into alignment with the free end of the skirt 7, or could fracture at some intermediate point, so that a part of each bridge remained with the cap and part remained with the tamper band member 13, it is preferred that the entire bridge remain with the tamper band member 13 as shown in FIG. 6.

Figure 7:
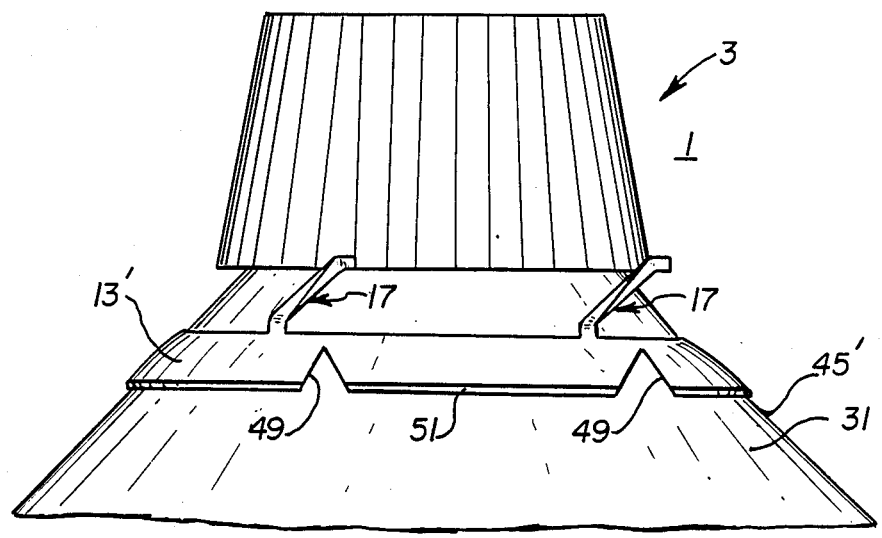
FIG. 7 is a side view of another embodiment of the closure in accordance with the invention in place on a container.

As illustrated in FIG. 7, where the shoulder 45' on the container 31 has a substantial axial as well as radial component, the tamper band member 13' can be provided with a number of spaced notches, preferably wedge shaped notches 49, extending generally radially inward from the outer perimeter 51, so that the tamper band member can conform more readily to and provide good surface contact with the inclined shoulder 45'.

Figure 8:
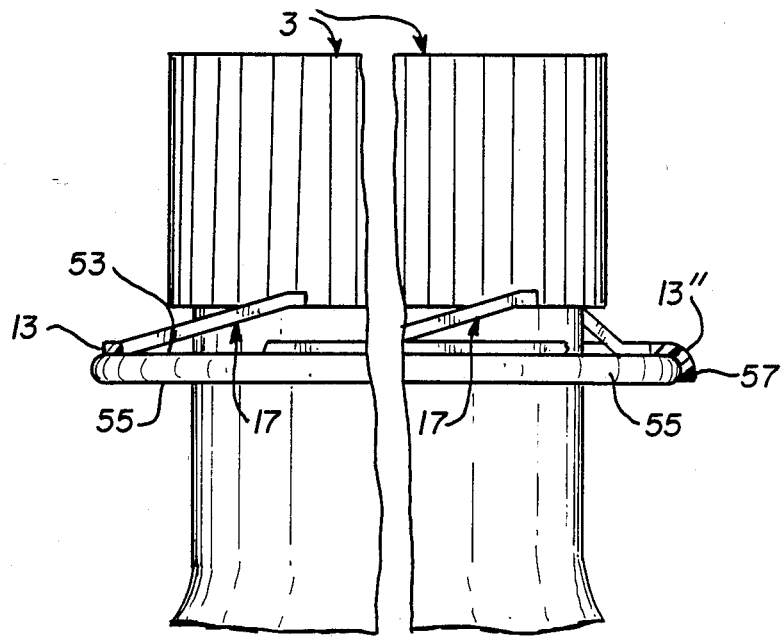
FIG. 8 is a composite side view with parts cut away of portions of two additional embodiments of the closure system in accordance with the invention.

FIG. 8 is a composite illustration showing application of the invention to closure systems wherein the generally laterally extending surface 53 on the container is defined by a radially extending transfer bead 55. As shown in the left side of FIG. 8, the tamper band member 13 may contact only the top surface 53 of the transfer bead or as shown in the right side, the tamper band member 13" may have a lip 57 which extends over the outer perimeter 59 of the transfer bead 55.

Figure 9:
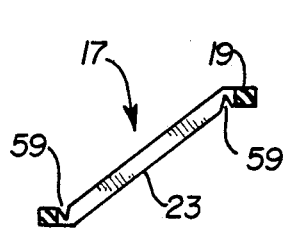
FIG. 9 is a vertical view illustrating a modified form of a connecting bridge which forms part of the closure of the invention.
Figure 10:
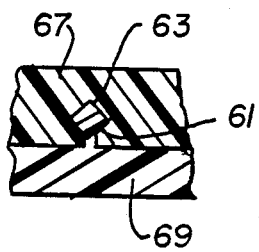
FIG. 10 is a sectional view illustrating a bond between a closure and a container of a dissimilar material in accordance with the teachings of the invention.
Figure 11:
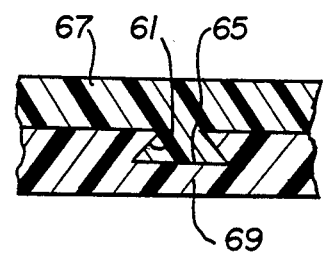
FIG. 11 is a modified form of the bond illustrated in FIG. 10.

As shown in FIG. 9 the bridges 17 may be provided with transverse score lines 59 at the intermediate sections with the end sections to increase the flexibility of the bridges. This also reduces the torque applied to the connections of the bridges to the tamper band member, and especially to the skirt 7 where the notches 25 and 27 reduce the cross-section, when the tamper band member is axially displaced When the closure and container are made of the same thermoplastic resin, the tamper band member 13 can be readily bonded to the container shoulder or transfer bead utilizing sonic welding or heat welding. However, when the closure and container are made of dissimilar materials of different hardnesses, conventional techniques for welding do not provide satisfactory bonding. In accordance with the invention, an undercut surface is provided on the shoulder 45 or transfer bead 55. Such an undercut surface 61 can be formed by a projection such as the diamond shaped tenon 63 shown in FIG. 10, or a dovetail groove shown in FIG. 11. In either case, application of acoustic or heat energy to the joint causes the softer material 67 to flow under the undercut surface 61 in the harder material 69 and form a mechanical connection between the two parts upon setting of the softer thermoplastic material. In the exemplary materials used for the closure system of the invention, the order of hardness is PET (hardest), polyvinyl chloride, polypropylene, high density polyethylene, low density polyethylene (softest). For any combinations of these materials or other suitable thermoplastics of different hardnesses, the undercut surface is formed in the harder material. Either the closure or the container may be made of the harder material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A closure for a container having a neck with external engagement means for receiving and retaining the closure and a generally laterally extending surface spaced from said engagement means; said closure comprising:

a cap having an end wall and a cylindrical skirt member depending from the end wall and terminating in a free end having a preset outer diameter, said skirt member having internal engagement means complimentary to the external engagement means on the container neck for selectively securing the cap to the container;

an annular tamper band member having an inside diameter larger than said outer diameter of the free end of said cylindrical skirt member and forming an annular gap therebetween; and a plurality of resilient bridges angularly spaced from one another around the gap between the free end of the cylindrical skirt member and the annular tamper band member, each of said bridges having a first segment extending generally radially outwardly from the free end of said skirt member, a second segment extending generally radially inwardly from the annular tamper band member at a point angularly displaced from the first segment, and an intermediate segment extending along said annular gap between said first and second segments; said cap, annular tamper band member and bridges being integrally molded with said annular tamper band member and bridges extending radially outward from the free end of said cylindrical skirt member on said cap and with said bridges being flexible to bend and permit axial extension of said annular tamper band member relative to the cylindrical skirt member to bring the tamper band member into contact with said generally laterally extending surface of the container for bonding thereto, and said bridges being frangible to fracture when the cap is removed from the container, said resilient bridges upon fracturing springing toward the member to which they remain integrally attached to provide a positive visual indication that the bridges have been fractured.

2. The closure of claim 1 wherein said engagement means comprise external threads on the neck of said container and complimentary internal threads on said cap skirt, and wherein said cap is removed by unscrewing the cap from the container which fractures said bridges.

3. The closure of claim 2 wherein at least one of said first and second segments of each of said bridges has a section of reduced cross-section along which said bridge fractures as said cap is unscrewed.

4. The closure of claim 3 wherein said at least one segment of each bridge is the first segment which extends generally radially outwardly from the free end of the skirt, and wherein said bridges remain integrally attached to and spring toward said tamper band member upon fracturing.

5. The closure of claim 4 wherein said section of reduced cross-section of said first segment is at the intersection of the first segment with the skirt member of said cap.

6. The closure of claim 3 wherein said bridges are provided with transverse bend lines to aid the bridges in flexing.

7. The closure of claim 6 wherein said transverse bend lines are at intersections of said intermediate segment with said first and second segments 8. A closure system comprising:
a container having a neck with external threads and a substantially laterally extending surface spaced axially from said external threads; and
a closure comprising:
a cap having an end wall and a cylindrical skirt depending member from the end wall and terminating in a free end having a preset outer diameter, said skirt member having internal threads complimentary to and engageable by the external threads on said neck to secure said cap to the container;
an annular tamper band member having an inner diameter larger than said outer diameter of the free end of said cylindrical skirt member and forming an annular gap therebetween; and
a plurality of resilient bridges angularly spaced from one another around the gap between the free end of the cylindrical skirt member and the annular tamper band member each of said bridges having a first segment extending generally radially outwardly from the free end of said skirt member, a second segment extending generally radially inwardly from the annular tamper band member at a point angularly displaced from the first segment, and an intermediate segment extending along said annular gap between said first and second segments; said cap, annular band member and bridges being integrally molded with said annular band member and bridges extending radially outward from the free end of said cylindrical skirt member on said cap and with said bridges being flexible to bend and permit axial extension of said annular tamper band member relative to the cylindrical skirt member to bring the tamper band member into contact with said generally laterally extending surface of the container for bonding thereto, and said bridges being frangible to fracture when the cap is removed from the container, said resilient bridges upon fracturing springing toward the member to which they remain integrally attached to provide a positive visual indication that the bridges have been fractured.

9. The closure system of claim 8 wherein said bridges fracture at the intersection of said first segment with said skirt member, said bridges being resilient such that said bridges when fractured spring against the generally laterally extending surface on the container adjacent said tamper band member.

10. The closure system of claim 8 wherein said generally laterally extending surface on said container also extends axially, and wherein said tamper band member has an outer perimeter provided with spaced slots extending generally radially inward into the tamper band member to permit said tamper band member to conform to said generally laterally and axially extending surface.

11. The closure system of claim 8 wherein said first segment of each of said bridges has a section of reduced cross-section along which said bridge fractures as said cap is unscrewed.

12. The closure system of claim 11 wherein said bridges are provided with transverse grooves at intersections of the intermediate segments with the first and second segments to aid the bridges in flexing.

13. The closure system of claim 8 wherein one of said tamper band member and said container is made of a harder material than the other and defines an undercut ledge, and wherein the other of said tamper band member and container is made of a softer material which flows under said undercut ledge to form a mechanical connection in response to the application of energy to the softer material to bond said tamper band member to said container.

14. The closure system of claim 13 wherein said container is made of the harder material and has at least two undercut ledges angularly spaced about said generally laterally extending surface, and wherein said tamper band member is made of said softer material which flows around said undercut ledges on the container.

15. The closure system of claim 14 wherein said undercut ledges are defined by projections extending from said generally laterally extending surface on said container.

16. The closure system of claim 14 wherein said container and tamper band member are made of different materials each selected from a group consisting essentially of polyethylene terephthalate, polyvinyl chloride, polypropylene, high density polyethylene and low density polyethylene.

17. A closure system comprising:
a container having a neck with external closure engagement means and a generally laterally extending surface spaced from said engagement means; and
a closure comprising;
a cap having an end wall and a cylindrical skirt depending from the end wall, said skirt having internal engagement means complimentary to the external engagement means on the container neck for selectively securing the cap to the container;
an annular tamper band;
a plurality of fracturable bridges joining said tamper band to said skirt of the cap;
one of said container and tamper band being of a material which is harder than the material of the other and defining at least one undercut ledge, and the other of said container and tamper band being made of a softer material which flows around said undercut ledge in response to energy applied to the softer material to form a mechanical connection between said container and tamper band, such that when said cap is removed from said container the tamper band remains secured to the container and said bridges fracture.

18. The closure system of claim 17 wherein said container is made of said harder material and has an undercut projection and wherein said tamper band is made of said softer material which flows around said undercut projection in response to the application of energy to said tamper band.

19. The closure system of claim 18 wherein said container and tamper band are made from different materials each selected from a group of materials consisting essentially of polyethylene terephthalate, polyvinyl chloride, polypropylene, high density polyethylene, and low density polyethylene.

20. The closure system of claim 17 wherein said undercut ledges are defined by projections extending outward from said one of said container and tamper band.

* * * * *

UNITED STATES PATENT AND TRADEMARK OFFICE
CERTIFICATE OF CORRECTION

PATENT NO. : 4,844,272

DATED : July 4, 1989

INVENTOR(S) : HERBERT V. DUTT

It is certified that error appears in the above-identified patent and that said Letters Patent is hereby corrected as shown below:

Column 2, line 46, "accurately" should be --arcuately--.

Column 4, line 23, a period --.-- should be inserted after "cap".

Column 5, line 47, a period --.-- should be inserted after "displaced".

Signed and Sealed this

Nineteenth Day of May, 1992

Attest:

DOUGLAS B. COMER

*Attesting Officer*     *Acting Commissioner of Patents and Trademarks*